United States Patent Office 3,194,017
Patented July 13, 1965

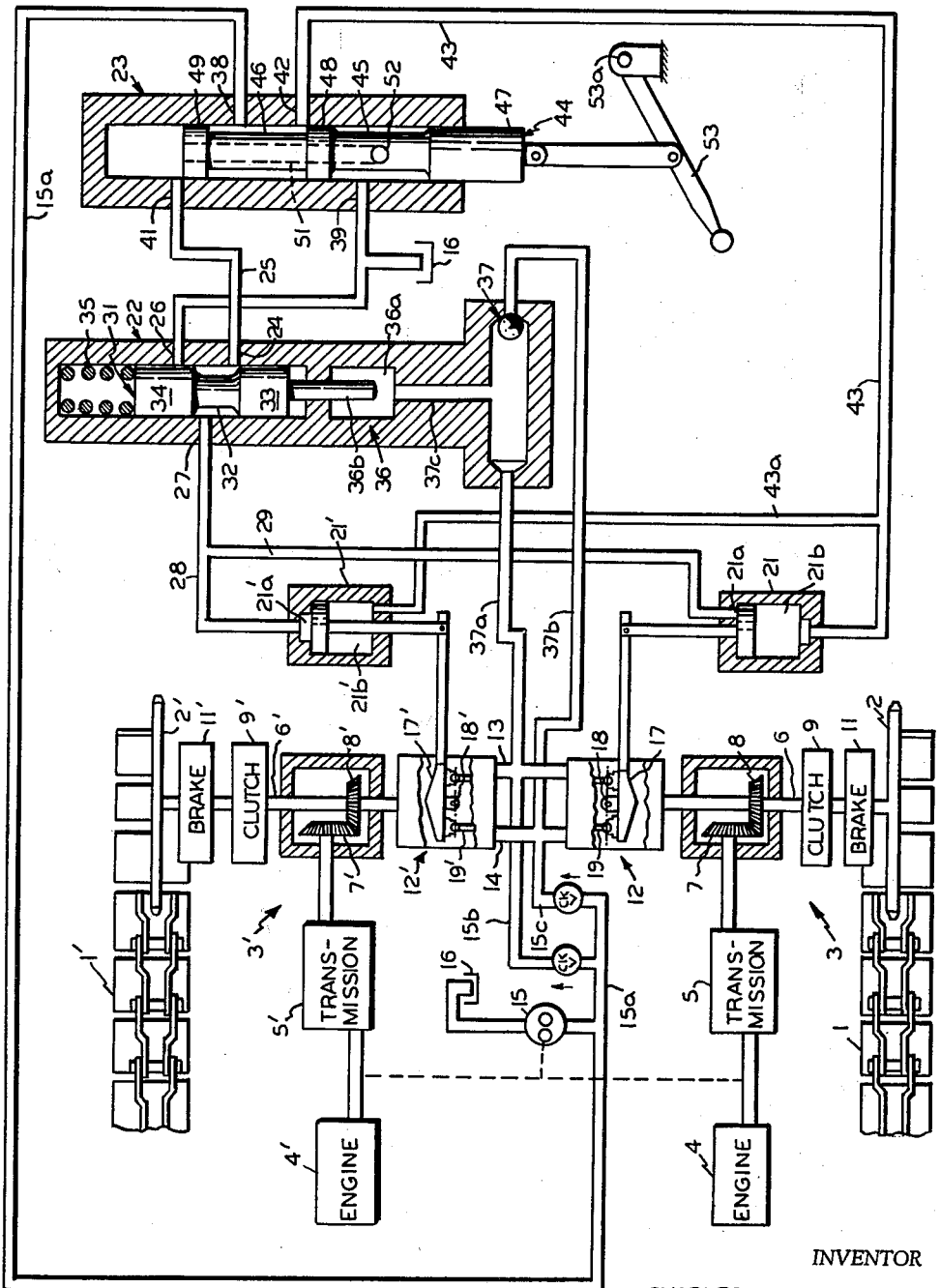

3,194,017
HYDROSTATIC TRANSMISSION
Charles O. Weisenbach, Watertown, N.Y., assignor to The New York Air Brake Company, a corporation of New Jersey
Filed Dec. 11, 1963, Ser. No. 329,787
6 Claims. (Cl. 60—53)

This invention relates to hydrostatic transmissions, and is particularly concerned with a hydrostatic transmission for transferring limited amounts of power in either direction between a pair of drive trains.

One environment in which the invention finds particular utility is that of the twin engine crawler tractor. In these machines, each engine is independently controlled and drives one of the vehicle's tracks through a multi-speed, forward and reverse transmission and a clutch. The speed of each engine is regulated by a throttle and by a fuel flow governor which limits peak power output and prevents overspeed. Steering of a crawler tractor is accomplished by operating the left and right tracks at different speeds, in different directions, or both. In a twin engine tractor such differential movement of the tracks may be effected by selecting different gear ratios for the two transmissions, by using different throttle settings for the two engines, by operating one transmission in forward and the other in reverse, or by a combination of these methods. In all of these cases, the power developed by both engines is made available for the steering operation. The twin engine tractor may also be steered by declutching one track and either braking it or merely allowing it to drag in order to develop the speed differential required for the active track to turn the tractor. However, in this case, the power developed by only one engine is available for steering purposes, and, depending upon factors such as the desired turn radius, the type of footing, the grade and the magnitude of the load being pushed or pulled, this might not satisfy the power demand of a particular turn. In this event, the active track stalls and the turn cannot be completed.

The object of this invention is to provide a hydrostatic transmission suitable for use in installations of the type mentioned which transmits a limited amount of power in reverse directions between a pair of drive trains, either of which may be loaded while the other is unloaded. According to this invention, the hydrostatic transmission includes a pair of variable displacement pump-motor units, each of which is adapted to be connected with one of the drive trains, and which are connected with each other in a closed hydraulic circuit by a pair of main conduits. The hydrostatic transmission is provided with a pressure compensating mechanism that regulates the displacement of whichever unit is serving as a pump in inverse relation to the pressure in the main conduit to which that unit discharges, and causes the other unit, i.e., the unit that is serving as a motor, to operate at maximum displacement. When this hydrostatic transmission is used in a twin engine crawler tractor, the two units are connected with the final drive trains ahead of the clutches. When one of the tracks is declutched, the speed of its engine rises above the speed of the other engine and this causes the hydraulic unit associated with the unloaded engine to commence to pump and drive the other unit as a motor. The pressure compensator then becomes effective to regulate the displacement of the pumping unit in inverse relation to its discharge pressure, and thus to limit the amount of power transferred from the unloaded engine to the final drive train of the loaded engine. In this way, the power delivered to the active track is increased and those turns which require large amounts of power can be negotiated.

In the preferred form of the invention, both hydraulic units are of the rotary cylinder barrel, longitudinally reciprocating piston type having a cam plate that is movable between minimum and maximum stroke positions for varying the displacement of the unit. The axis about which each cam plate swings is positioned so that the thrust forces of the pistons urge the cam plate toward the minimum stroke position when the unit is pumping and toward the maximum stroke position when the unit is motoring. The pressure compensator in this embodiment includes a pair of fluid pressure motors that urge the cam plates in the stroke-increasing direction and a single pilot valve for simultaneously venting and pressurizing both motors. This pilot valve is selectively connected with whichever of the two main conduits is the higher pressure conduit by a shuttle valve that responds to the pressure differential between these conduits so that the compensator not only inherently limits the power transmitted in either direction between the drive trains, but also is able to perform this function independently of the direction of rotation of the hydraulic units. Thus, in the case of the twin engine tractor, the invention provides for transfer of power from the unloaded engine to the active track when the vehicle is moving in either the forward or the reverse direction.

Another feature of the preferred embodiment concerns the provision of a selectively operable override device that disables the pressure compensator and positions the cam plate of each hydraulic unit in the zero stroke position. The inclusion of this device prevents circulation of oil through the closed hydrostatic transmission circuit when transfer of power between the drive trains is not required, and thus reduces energy losses at this time, and also enables the drive trains to operate at different speeds. In the case of the twin engine tractor, this feature is important because it permits minor steering corrections to be made by decelerating one of the engines.

The preferred embodiment of the invention is described herein with reference to the accompanying drawing whose single figure is a schematic diagram of the hydrostatic transmission as applied to a twin engine crawler tractor.

As shown in the drawing, the invention is embodied in a crawler tractor having left and right tracks 1 and 1', respectively, which are provided with drive sprockets 2 and 2' that normally are driven by the power plants 3 and 3', respectively. Power plant 3 includes an engine 4, a multi-speed, forward and reverse transmission 5, that usually includes a torque converter and which delivers power to the final drive shaft 6 through a pair of bevel gears 7 and 8. Final drive shaft 6 is coupled to the sprocket 2 through a clutch 9 and a brake 11. The speed of engine 4 is controlled by a throttle (not shown), and by a fuel flow governor (also not shown) which is of the proportional control type and operates with a speed droop on the order of 5% to 10%, i.e., the governed speed of engine 4 varies about 5 to 10% between full load and no load conditions. Power plant 3' is identical to power plant 3 so its components bear the same reference numerals with primes added for clarity. The speed ranges of the governors associated with the engines 4 and 4' are, of course, also approximately the same.

The final drive shafts 6 and 6' are connected with a pair of identical variable displacement, pump-motor units 12 and 12' which are connected in a closed hydraulic circuit by a pair of main conduits 13 and 14. This closed circuit is maintained liquid-filled by a charge pump 15 which is driven by the engines 4 and 4' and which is arranged to draw fluid from a reservoir 16 and deliver it to the low pressure side of the closed circuit through conduit 15a and either conduit 15b or conduit 15c. As usual, the conduits 15b and 15c contain check valves. The complete transmission includes a relief circuit (not shown)

which limits the pressure in both sides of the closed circuit and which provides a cooling path through which fluid flows continuously from the low pressure side to reservoir 16. The relief circuit described in Patent 2,961,829, granted November 29, 1960, is one which may be used. The hydraulic units 12 and 12' are of the rotary cylinder barrel, longitudinally reciprocating piston type, such as the ones marketed by the applicant's assignee under the trademark Dynapower, and include cam plates 17 and 17', respectively, which are angularly adjustable about the axes of trunnions 18 and 18' between zero and maximum stroke positions. The trunnion axes are normal to and intersect the axes of rotation of the cylinder barrels so that the thrust forces exerted by the pistons 19 or 19' of each unit urge the associated cam plate toward the illustrated zero stroke position when the unit is pumping and toward the maximum stroke position when the unit is motoring. This reversal of the direction of action of the biasing force developed by the pistons is believed to be attributable to an apparent extension, in the direction of rotation, of the high pressure port in the stationary, radial valve face against which the valving end of the cylinder barrel abuts, and, as will be apparent from the following description, it accounts for the simplicity of the controls used in the illustrated embodiment.

The cam plates 17 and 17' of the two pump-motor units 12 and 12' are positioned by a pair of double-acting motors 21 and 21', respectively, which are controlled primarily by a pilot valve 22, and secondarily by an override valve 23. Pilot valve 22 includes an inlet passage 24 which is selectively connected with charge pump conduit 15a and reservoir 16 through conduit 25 and override valve 23, an exhaust passage 26 which is in continuous communication with the reservoir 16, a motor passage 27 which is connected with the working chambers 21a and 21a' of motors 21 and 21' through conduit 28 and through conduits 28 and 29, respectively, and a movable valve plunger 31 formed with an annular groove 32 that defines two valve lands 33 and 34. Valve plunger 31 has a supply position, which is illustrated, in which groove 32 interconnects passages 24 and 27 and land 34 closes passage 26, and is movable upward from that position to a lap position, in which lands 33 and 34 isolate motor passage 27 from the passages 24 and 26, respectively, and thence to a vent position in which groove 32 interconnects passages 26 and 27 and land 33 blocks passage 24. The valve plunger is biased downward toward the supply position by a coil compression spring 35 and is shifted in the opposite direction against this bias by a motor 36 defined by a working chamber 36a and a piston 36b that abuts the lower end of the valve plunger. A shuttle valve 37, which is connected with the main conduits 13 and 14 through conduits 37a and 37b, respectively, and with working chamber 36a through passage 37c, responds to the pressure differential between the main conduits and serves to connect motor 36 with whichever of these conduits is at the higher pressure.

Override valve 23 includes an inlet passage 38 which is connected with charge pump conduit 15a, an exhaust passage 39 which is in continuous communication with reservoir 16, and a pair of outlet passages 41 and 42; the outlet passage 41 being connected with the conduit 25 leading to pilot valve 22, and the outlet passage 42 being connected with the working chambers 21b and 21b' of motors 21 and 21' through conduit 43 and through conduits 43 and 43a, respectively. Flow through override valve 23 is controlled by a valve plunger 44 formed with a pair of annular grooves 45 and 46 that define three spaced lands 47, 48 and 49, and with an axial bore 51 which opens through the upper end of the plunger and terminates at its lower end at a cross passage 52 leading into annular groove 45. A lever 53 is provided for shifting valve plunger 44 between the illustrated disengage position, in which passages 38 and 42 are interconnected by annular groove 46 and passages 39 and 41 are interconnected by bore 51, cross passage 52 and annular groove 45, and an engage position in which annular groove 45 interconnects passages 39 and 42 and annular groove 46 interconnects passages 38 and 41. Lever 53 may be operated manually or automatically upon disengagement of one of the clutches 9 and 9'.

*Operation*

When the engines 4 and 4' are running and override valve 23 is in the illustrated disengage position, a portion of the fluid discharged by charge pump 15 is delivered to the working chambers 21b and 21b' of motors 21 and 21' via conduit 15a, inlet passage 38, annular groove 46, outlet passage 42 and either conduit 43 or conduits 43 and 43a. Since the inlet passage 26 of pilot valve 22 is connected with reservoir 16 via conduit 25, outlet passage 41, axial bore 51, cross passage 52, annular groove 45 and exhaust passage 39, working chambers 21a and 21a' are vented and motors 21 and 21' move cam plates 17 and 17', respectively, to their illustrated zero stroke positions. As a result, no fluid is circulated through the closed hydraulic circuit by units 12 and 12'. Under these conditions, the tracks 1 and 1' may be driven at the same or different speeds in either the same or different directions and the tractor operates the same as any similar tractor which does not embody the invention.

If the tractor is moving in the forward direction (i.e., to the left in the drawing) with engines 4 and 4' operating at the same speed and the transmissions 5 and 5' set for the same gear ratio, the operator may make a right turn by disengaging clutch 9', applying brake 11', and simultaneously pivoting lever 53 in the clockwise direction about its pivot 53a to shift valve plunger 44 to its engage position. As mentioned above, in this position of the valve plunger, inlet passage 24 of pilot valve 22 is connected with the charge pump conduit 15a via conduit 25, outlet passage 41, annular groove 46 and inlet passage 38, and the two working chambers 21b and 21b' are connected with reservoir 16 through conduit 43, or conduits 43 and 43a, and outlet passage 42, annular groove 45 and exhaust passage 39. Although the engines 4 and 4' had been operating at the same speed, the speed droop characteristic of the governor associated with engine 4' permits this engine to accelerate as soon as clutch 11' is disengaged. Since hydraulic unit 12' is now being driven at a higher speed than unit 12, unit 12' becomes a pump and commences to drive unit 12 as a motor. Inasmuch as the working chambers 21b and 21b' are now vented, the thrust forces exerted by pistons 19 and 19' move cam plates 17 and 17' in the clockwise direction about the axes of their trunnions 18 and 18' toward their maximum displacement positions. Under these conditions, it is assumed that unit 12' discharges to main conduit 13 so that pressure in this conduit now rises above the pressure in main conduit 14. The pressure differential across unit 12 causes that unit to generate an output torque which, since the drive shaft of this unit is connected with final drive shaft 6, is added to the output of transmission 5.

Since main conduit 13 is now the high pressure conduit, shuttle valve 37 shifts to its illustrated position (if it is not already in that position) and connects this main conduit with working chamber 36a via conduits 37a and 37c. As the working pressure in main conduit 13 increases, motor 36 commences to move valve plunger 31 upward against the bias of spring 35. When the pressure in the main conduit reaches the desired maximum, valve plunger 31 will be in the lap position in which the communication between charge pump 15 and working chamber 21a' is interrupted. Should the working pressure now rise above this value, motor 36 will shift plunger 31 to the vent position in which working chamber 21a' is connected with reservoir 16 through conduit 28, motor passage 27, annular groove 32 and exhaust passage 26, and the biasing force developed by pistons 19' will move cam plate 17' back toward its zero stroke position. When the resulting reduction in the displacement of unit 12' restores the working pressure to the desired maximum value, valve plunger 31 shifts downward to its lap position and hydraulically locks motor 21'. In the event the working pressure in main conduit 13 decreases below the desired value, as a result, for example, of an increase in the speed of track 1, spring 35 will shift valve plunger 31 to its supply position to thereby permit fluid at charge pump pressure to be transmitted from inlet passage 26 to working chamber 21a'. In this case, motor 21' moves cam plate 17' in the stroke-increasing direction until the working pressure is restored to the desired value. At that time, motor 36 returns valve plunger 31 to its lap position and causes it to again hydraulically lock motor 21'. Since the controls for the hydrostatic transmission maintain a substantially constant pressure in main conduit 13, motor 12 adds a substantially constant torque to the final drive shaft 6. The magnitude of this torque depends upon the design of spring 35 and is selected to be well within the capability of engine 4'.

It might be mentioned here that since working chamber 21a is connected with conduit 28 by conduit 29, pilot valve 22 vents and pressurizes this working chamber as well as working chamber 21a' as the working pressure in main conduit 13 varies. However, since during a right turn, unit 12 is a motor and its cam plate 17 is held in the maximum displacement position by the biasing force developed by piston 19, the fact that working chamber 21a is vented and pressurized by pilot valve 22 has no effect on the displacement of this unit.

After the tractor has been turned through the desired angle, the operator engages clutch 9' to again connect sprocket 2' with the final drive shaft 6'. Since the load of track 1' is now imposed on engine 4', the speed of this engine decreases and unit 12' now runs at the same speed as unit 12. As a result, the pressure in main conduit 13 decreases, spring 35 shifts valve plunger 31 to its supply position, and motor 21' moves cam plate 17' to its maximum displacement position. At this time, override valve 23 is returned to its illustrated disengage position to thereby vent working chambers 21a and 21a', and connect working chambers 21b and 21b' with charge pump 15. The motors 21 and 21' now move cam plates 17 and 17' to their illustrated zero stroke positions. The inclusion of this override valve 23 is desirable first, because it prevents circulation of oil in the closed hydrostatic transmission circuit by the units 12 and 12' at times when power transfer is not required, and thus reduces energy losses, and second, because it allows minor steering corrections to be made by decelerating one of the engines 4 and 4'.

A turn to the left may be effected by disengaging clutch 9, and if power transfer is desired, by simultaneously shifting override valve 23 to its engage position. In this case, units 12 and 12' serve as the pump and motor, respectively, and main conduit 14 is the high pressure conduit. Therefore, shuttle valve 37 shifts to the left to close conduit 37a and to interconnect conduits 37b and 37c. Since the cam plate 17 of unit 12 is now biased toward the zero displacement position and the cam plate 17' of unit 12' is biased toward the maximum displacement position, the venting and supply action of pilot valve 22 serves to vary the displacement of unit 12 in inverse relation to the pressure in main conduit 14, but has no effect on the displacement of unit 12'. Therefore, as in the preceding case, one of the hydraulic units operates at maximum displacement and the other operates at a varying displacement that is a function of the working pressure in the closed circuit. Engagement of clutch 9 and return of override valve 23 to its illustrated position re-establishes normal straight operation and disengages the hydrostatic transmission.

When the tractor is moving in the reverse direction, i.e., to the right in the drawing, right and left turns are effected in the same way as during the forward mode of operation. However, since in the reverse mode, the transmissions 5 and 5' drive shafts 6 and 6', respectively, in the opposite direction, the direction of rotation of the two hydraulic units 12 and 12' changes. Therefore, during a right turn, the pumping unit 12' discharges to main conduit 14 and this conduit is the high pressure conduit, and during a left turn, the pumping unit 12 discharges to main conduit 13 and this conduit is the high pressure conduit. Since this reversal in the direction of flow through the closed transmission circuit accompanies the reversal in the direction of rotation of the two units, each cam plate is still urged toward the zero and maximum displacement positions, respectively, during pumping and motoring. In view of this, it should be apparent that the operation of the controls for the hydrostatic transmission remains unchanged.

As stated previously, the drawing and description relate only to the preferred embodiment of the invention. Since changes can be made in the structure of this embodiment without departing from the inventive concept, the following claims should provide the sole measure of the scope of the invention.

What I claim is:
1. A hydrostatic transmission including
  (a) two variable displacement pump-motor units either of which may serve as a pump while the other serves as a motor;
  (b) a pair of main conduits connecting the two units in a closed transmission circuit; and
  (c) control means for varying the displacement of the first unit in inverse relation to its discharge pressure and for causing the second unit to operate at maximum displacement when the first unit is pumping, and for varying the displacement of the second unit in inverse relation to its discharge pressure and for causing the first unit to operate at maximum displacement when the second unit is pumping.
2. A hydrostatic transmission including
  (a) two variable displacement pump-motor units either of which may serve as a pump while the other serves as a motor;
  (b) the pump-motor units being of the rotary cylinder barrel, longitudinally reciprocating piston type and each having a cam plate which is angularly adjustable between minimum and maximum displacement positions about an axis that is normal to and intersects the rotational axis of the unit, whereby the thrust forces transmitted between the cam plate and the pistons urge the cam plate toward the minimum and maximum displacement positions, respectively, when the unit is serving as a pump and as a motor;
  (c) a pair of main conduits connecting the two units in a closed transmission circuit;
  (d) an actuating motor for moving each cam plate toward the maximum displacement position; and
  (e) control means responsive to the pressure in the main conduit to which the first unit discharges when it is pumping for energizing and de-energizing at least the actuating motor associated with the first unit as the pressure falls below and rises above, respectively, a first value, and responsive to the pressure in the main conduit to which the second unit discharges when it is pumping for energizing and de-energizing at least the actuating motor associated with the second unit as the pressure falls below and rises above, respectively, a second value.
3. The transmission defined in claim 2 in which the control means includes
  (a) a pressure responsive actuator that energizes and de-energizes both actuating motors when the pressure supplied to it falls below and rises above, respectively, a certain value, and
  (b) a shuttle valve for connecting the actuator with whichever of the main conduits is at the higher pressure.

4. The transmission defined in claim 3 including selectively operable override means for placing both cam plates in their minimum displacement positions and preventing the control means from altering these positions.

5. The transmission defined in claim 2 which includes a source of control fluid under pressure and a reservoir; and in which
  (a) both actuating motors are fluid pressure motors; and
  (b) the control means includes
    (1) a control valve having an inlet passage connected with the source, an exhaust passage connected with the reservoir, an outlet passage connected with both actuating motors and a movable element having a first position in which the outlet passage is connected with the inlet passage, a second position in which the outlet passage is connected with the exhaust passage, and an intermediate position in which the outlet passage is isolated from both the inlet passage and the exhaust passage,
    (2) means biasing the control valve toward its first postion,
    (3) a fluid pressure control motor for moving the control valve toward its second position, and
    (4) a shuttle valve responsive to the pressure differential between the two main conduits for connecting the control motor with whichever of the main conduits is at the higher pressure.

6. The transmission defined in claim 5 including
  (a) a third fluid pressure actuating motor for moving the cam plate of one unit to the minimum displacement position;
  (b) a fourth fluid pressure actuating motor for moving the cam plate of the other unit to the minimum displacement position; and
  (c) override valve means connected with the reservoir and the third and fourth actuating motors and interposed in the connection between the source and the inlet passage of the control valve, said override valve means having a first position in which it connects said inlet passage with the reservoir and connects said third and fourth actuating motors with the source, and a second position in which it connects said inlet passage with the source and connects the third and fourth actuating motors with the reservoir.

References Cited by the Examiner

UNITED STATES PATENTS 2,941,365  6/60  Carlson et al. _____ 60—19
2,942,421  6/60  Hann et al. _____ 60—19

JULIUS E. WEST, *Primary Examiner.*